(12) United States Patent
Mermelstein

(10) Patent No.: US 10,069,155 B2
(45) Date of Patent: Sep. 4, 2018

(54) PROCESS CONTROL FOR INTEGRATED HYDROGEN STORAGE IN FUEL CELL ENERGY STORAGE SYSTEM

(71) Applicant: The Boeing Company, Chicago, IL (US)

(72) Inventor: Joshua M. Mermelstein, Laguna Niguel, CA (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 14/834,062

(22) Filed: Aug. 24, 2015

(65) Prior Publication Data
US 2017/0062848 A1 Mar. 2, 2017

(51) Int. Cl.
| | | |
|---|---|---|
| H01M 8/06 | (2016.01) | |
| H01M 8/04082 | (2016.01) | |
| H01M 8/04089 | (2016.01) | |
| H01M 8/18 | (2006.01) | |
| H01M 8/0438 | (2016.01) | |
| H01M 8/04746 | (2016.01) | |
| H01M 8/124 | (2016.01) | |

(52) U.S. Cl.
CPC ... *H01M 8/04201* (2013.01); *H01M 8/04097* (2013.01); *H01M 8/04402* (2013.01); *H01M 8/04761* (2013.01); *H01M 8/186* (2013.01); *H01M 2008/1293* (2013.01); *Y02E 60/528* (2013.01)

(58) Field of Classification Search
CPC ........ H01M 8/04201; H01M 8/04097; H01M 8/186; H01M 8/04402; H01M 8/04761; H01M 2008/1293
See application file for complete search history.

(56) References Cited

U.S. PATENT DOCUMENTS

| | | | |
|---|---|---|---|
| 6,792,981 B1* | 9/2004 | Manning | F17C 5/06 141/18 |
| 6,815,106 B1* | 11/2004 | Salvador | H01M 8/04089 429/427 |
| 2003/0141200 A1* | 7/2003 | Harada | C25B 1/12 205/637 |

FOREIGN PATENT DOCUMENTS

JP 06150953 A * 5/1994 .......... H01M 8/0612

OTHER PUBLICATIONS

Ali Ghanbariannaeeni and Ghazalehsadat Ghazanfarihashemi, Tehran, Iran; Pipeline and Gas Journal; Bypass Method for Recip Compressor Capacity Control; http://www.pipelineandgasjournal.com/bypass-method-recip-compressor-capacity-control; Jun. 2012, vol. 239 No. 6.

(Continued)

*Primary Examiner* — Jane Rhee
(74) *Attorney, Agent, or Firm* — Miller, Matthias & Hull LLP

(57) ABSTRACT

A process control system includes a storage chamber, a fuel cell in fluid communication with the storage chamber via a feed line, a suction dampening drum in fluid communication with the fuel cell via a product line, a compressor in fluid communication with the suction dampening drum and the storage chamber, a recycle line disposed between the feed line and the product line, and a pressure controller disposed in the recycle line. When the fuel cell is in an electrolysis mode, the pressure controller may be operated to maintain a minimum pressure level inside the drum.

20 Claims, 3 Drawing Sheets

(56) References Cited

OTHER PUBLICATIONS

Engineering Design Encyclopedia; Typical PFD for Centrifugal Compressor Systems; http://www.enggcyclopedia.com/2012/01/typical-pfd-centrifugal-compressor-systems/.
Piping Engineering; Anti-Surge Valve Piping for Gas Compressor; http://www.piping-engineering.com/anti-surge-valve-piping-gas-compressor.htnnl.

* cited by examiner

PROCESS CONTROL FOR INTEGRATED HYDROGEN STORAGE IN FUEL CELL ENERGY STORAGE SYSTEM

This invention was made with Government support under contract number N394309-14-C-1487 awarded by the Department of Defense. The Government has certain rights in this invention.

FIELD OF THE DISCLOSURE

The present disclosure relates generally to process control in fuel cell systems and, more particularly, to process control in reversible solid oxide fuel cell systems.

BACKGROUND OF THE DISCLOSURE

Fuel cells are generally known for providing electrical energy for various applications. For example, such fuel cells may convert hydrogen into electrical energy. During the conversion process, water and heat may also be generated, which may be used in secondary applications or disposed of as byproducts. Some fuel cells may be reversible to produce hydrogen. For example, a reversible solid oxide fuel cell (RSOFC) may have a power mode, during which the RSOFC consumes hydrogen to produce electricity, and an electrolysis mode, during which the RSOFC consumes electricity and water to produce hydrogen. A system equipped with a RSOFC may thus use a hydrogen supply to provide electricity at night and use electricity provided by, for example, solar panels to replenish the hydrogen supply during the day.

Typically, a RSOFC system includes a RSOFC, a hydrogen storage chamber, a compressor to compress hydrogen gas for storage, a connection to an electrical power distribution grid, and a connection to an external electrical energy source. The external electrical energy may be a fossil fuel generator, a nuclear reactor, or a renewable energy source such as a solar panel, a hydroelectric turbine, a windmill, or general utility grid. The use of a renewable energy source provides the additional benefit of making the RSOFC system self-sustaining and thus particularly well suited for use on islands or remote locations.

When operating in electrolysis mode to produce hydrogen, a compressor may be used to pressurize the hydrogen prior to reaching the storage chamber. Pressure pulses generated during the compression stage of the compressor risk creating a vacuum in the suction line, which could draw ambient air into the system. Because hydrogen is highly explosive, such introduction of ambient air must be prevented to avoid explosion and resultant damage to the system and surrounding environment. Even if the compressor does not draw a negative pressure, it may induce pressure fluctuations in the system which can make the RSOFC difficult to control.

SUMMARY OF THE DISCLOSURE

In accordance with one embodiment, a process control system includes at least one storage chamber holding hydrogen, a fuel cell in fluid communication with the at least one storage chamber via a feed line, a suction dampening drum in fluid communication with the fuel cell via a product line, and a compressor in fluid communication with the suction dampening drum and the at least one storage chamber. A recycle line extends from the feed line to the product line and independent of the fuel cell, and a pressure controller is disposed in the recycle line and configured to selectively communicate hydrogen from the at least one storage chamber to the suction dampening drum through the recycle line.

In accordance with another embodiment, a process control system includes a storage chamber holding hydrogen, a fuel cell in fluid communication with the storage chamber via a feed line, the fuel cell having a power mode and an electrolysis mode, a suction dampening drum in fluid communication with the fuel cell via a product line, and a compressor in fluid communication with the suction dampening drum via a suction line and the storage chamber via a high pressure line. A recycle line extends from the feed line to the product line independent of the fuel cell, and a pressure controller disposed in the recycle line and configured to determine a sensed drum pressure inside the suction dampening drum, the pressure controller further being configured to selectively communicate the hydrogen from the storage chamber to the suction dampening drum via the recycle line to maintain the sensed drum pressure at or above a predetermined minimum drum pressure level.

In accordance with yet another embodiment, a method of process control for a fuel cell system having a storage chamber holding hydrogen, a fuel cell, and a suction dampening drum is provided that includes monitoring a sensed drum pressure inside the suction dampening drum, and communicating the hydrogen from the storage chamber to the suction dampening drum through a recycle line independent of the fuel cell when the sensed drum pressure is below a predetermined minimum drum pressure level.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

DETAILED DESCRIPTION

Figure 1:
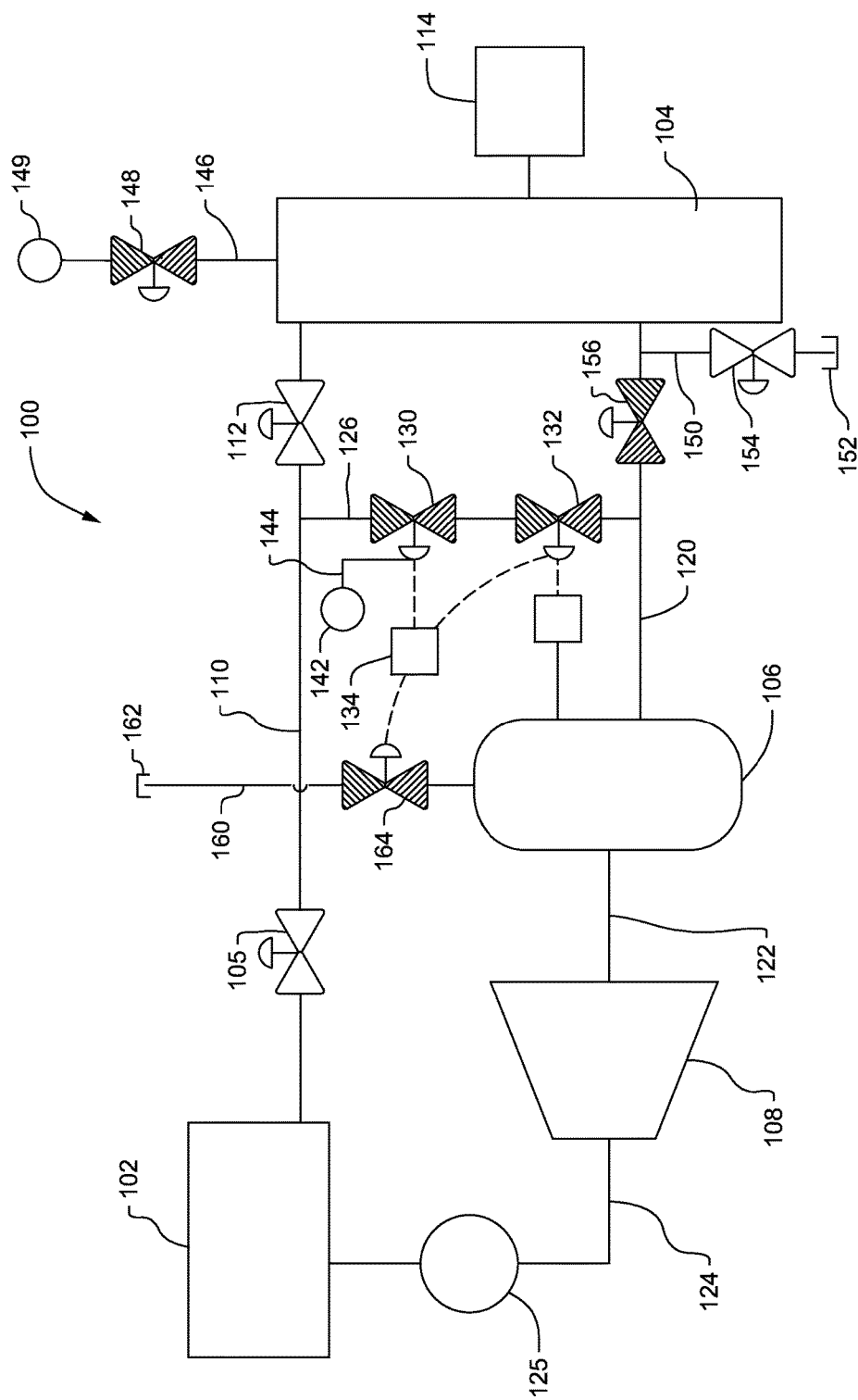
FIG. 1. is a schematic representation of a process control system for a RSOFC system during a power mode in one embodiment of the present disclosure.

Referring now to the drawings and with specific reference to FIG. 1, a process control system consistent with certain embodiments of the present disclosure is generally referred to by reference numeral 100. It is to be understood that although the process control system 100 is illustrated as having singular examples of the structures to be described, the process control system 100 may have multiple examples of these structures, such as more than one gas storage chamber 102, more than one reversible solid oxide fuel cell (RSOFC) 104, more than one suction dampening drum 106, and more than one compressor 108, etc. As used herein, the term "process control system" refers to an arrangement of structures that performs an operation involving the routing of fluids for a particular process, such as, but not limited to, energy production, energy storage, electrochemical processing, etc. It is to be understood that the process control system 100 is shown primarily for illustrative purposes to assist in disclosing features of various embodiments, and that FIG. 1 does not depict all of the components of a process control system 100 or a wider RSOFC system of which the process control system 100 may be a part.

The process control system 100 may include the gas storage chamber 102 in fluid communication with the RSOFC 104 via a feed line 110. In certain embodiments, the gas storage chamber 102 may include one or more tube shaped structures. A regulator 105 may be disposed in the feed line 110 upstream of a recycle line 126. Additionally, a feed valve 112 may be disposed in the feed line 110 between the recycle line 126 and the RSOFC 104. As shown in FIG. 1, during a power mode of the RSOFC 104 in which the RSOFC 104 may consume hydrogen to produce electricity, the feed valve 112 may be open. The electrical energy produced by the RSOFC 104 may be accessed by an external power-drawing load via an interface 114. The power-drawing load may be any manner of electrically operated device, power grid, or the like. The RSOFC 104 further may fluidly communicate with the suction dampening drum 106 via a product line 120.

While the product line 120 and further structures downstream of the product line 120 are not used during a RSOFC 104 power mode, their arrangements with respect to the RSOFC 104, the feed line 110, and the gas storage chamber 102 should be understood. The operations resulting from the arrangements of the product line 120 and structures downstream of the product line 120 will be described below in connection with an electrolysis mode of the process control system 100.

Returning to the suction dampening drum 106 of FIG. 1, it may further fluidly communicate with the compressor 108 via a suction line 122. The compressor 108, in turn, may fluidly communicate with the gas storage chamber 102 via a high pressure line 124. In some embodiments, a condenser 125 may be disposed in the high pressure line 124 to remove water from the fluid flowing therethrough.

The process control system 100 further may include the recycle line 126 extending between the feed line 110 and the product line 120 independent of the RSOFC 104. In the illustrated embodiment, the recycle line 126 branches off of the feed line 110 at a point located between the regulator 105 and the feed valve 112, thereby directly communicating between the feed line 110 and the product line 120 while bypassing the RSOFC 104. The recycle line 126 may include a pressure valve 130. In some embodiments, the pressure valve 130 may be provided as a ball valve having a pneumatic actuator. A compressed air source 142 may fluidly communicate with the pneumatic actuator of the pressure valve 130 through an air line 144 to actuate the pressure valve 130. A main controller 134 may be operably coupled to the pressure valve 130 to control operation of the valve. Additionally, a pressure controller 132 may be disposed in the recycle line 126 downstream of the pressure valve 130. In some embodiments, the pressure controller 132 may be provided as a closed-loop device that sets, measures, and controls a mass flow of fluid travelling threrethrough. The pressure controller 132 may be programmed to have a desired pressure setting, or alternatively may be coupled to the main controller 134, in which case the main controller 134 may provide the desired pressure setting. Using a PID control loop, for example, the pressure controller 132 may modulate the fluid flow rate passing through the recycle line 126, thereby to maintain the desired pressure setting. In the power mode of operating the RSOFC 104, the pressure valve 130 and the pressure controller 132 may be closed to prevent fluid flow through the recycle line 126, so that hydrogen from the gas storage chamber 102 is directed to the RSOFC 104. The RSOFC 104 converts the hydrogen into electrical energy that may be accessed by the external power drawing load via the interface 114.

The process control system 100 may also include a water line 146 in fluid communication with the RSOFC 104. The water line 146 may fluidly communicate with a water source 149 and have a water valve 148 which may be closed to prevent the flow of water to the RSOFC 104 during the power mode and opened to permit the flow of water during the electrolysis mode. A vent line 150 branches off of the product line 120 for venting exhaust gases through an exhaust vent 152 during the power mode. First and second vent valves 154, 156 are provided in the vent line 150 and product line 120, respectively, to control access to the exhaust vent 152.

Figure 2:
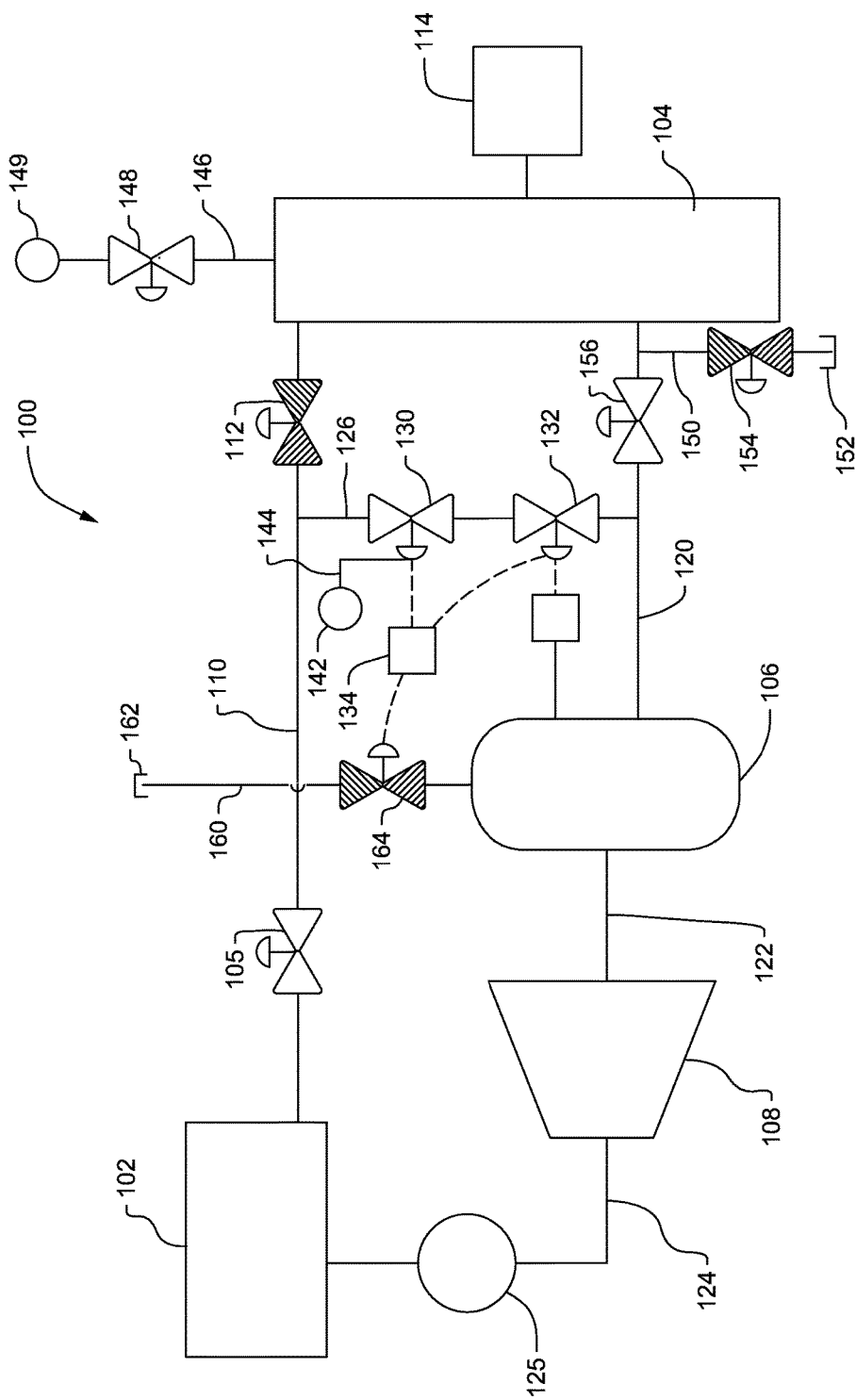
FIG. 2 is a schematic representation of the process control system of FIG. 1 during an electrolysis mode in one embodiment of the present disclosure.

FIG. 2 illustrates the electrolysis mode, in which the process control system 100 is operated so that the RSOFC 104 electrolyzes water to produce hydrogen. In the electrolysis mode, an external power source may be operably coupled to the RSOFC 104 via the interface 114. The external power source may be any manner of electrical generator including, but not limited to, a fossil fuel generator, a nuclear reactor, a solar panel, a windmill, a water turbine, or the like. Additionally, the water valve 148 may be opened to supply water to the RSOFC 104, while the feed valve 112 is closed to prevent the flow of hydrogen into the RSOFC 104. The RSOFC 104 converts the water and electricity inputs into hydrogen and oxygen, with the hydrogen gas exiting the RSOFC 104 through the product line 120.

It should be understood that not all of the water supplied to the RSOFC 104 may be electrolyzed and therefore, depending on the temperature and pressure in the product line 120, some unreacted steam may also flow through the product line 120. Under suction provided by the compressor 108, which in some embodiments may be a reciprocating type compressor, the steam and hydrogen may be drawn into the suction dampening drum 106 where some of the steam may condense into droplets and separate from the hydrogen. Hydrogen and the residual steam may then travel via the suction line 122 to the compressor 108 where it is compressed, causing additional water to condense and separate from the hydrogen. The compressed hydrogen (and any further remaining steam) then may be sent to the condenser 125 via the high pressure line 124, where the remainder of the steam may condense and separate from the hydrogen. The compressed hydrogen then may be sent to the gas storage chamber 102 via the high pressure line 124.

The pressure controller 132 may be operated to maintain a minimum pressure level in the process control system 100 during electrolysis mode of the RSOFC 104, thereby to mitigate creation of a vacuum that could draw ambient air into the system. More specifically, the pressure controller 132 may be configured to modulate based on a pressure level in the drum 106. For example, the pressure controller 132 may have a set point corresponding to a minimum drum pressure level, and the pressure controller 132 may automatically open or close based on the sensed pressure level from the drum 106. In some embodiments, the minimum pressure level may be six inches water column to ensure that a vacuum is not formed in the process control system 100. More specifically, if the sensed drum pressure is less than the minimum drum pressure level, the pressure controller 132 may open, thereby allowing a greater mass flow of hydrogen from the gas storage chamber 102 into the product line 120 via the recycle line 126. The pressure controller 132 may stay open until the internal pressure of the suction dampening drum 106 reaches the minimum drum pressure level.

In some embodiments, a drum pressure pre-check assembly may be provided to ensure that the initial drum pressure is not too high at system start-up. As shown in FIGS. 1 and 2, the drum pressure pre-check assembly includes a pre-check line 160 fluidly communicating between the drum 106 and a vent 162, and a pre-check valve 164 disposed in the pre-check line 160. At system start-up, the actual drum pressure is determined and, if it exceeds a maximum drum pressure level, the pre-check valve 164 is opened until the sensed drum pressure reaches a pre-check drum pressure level. In the above example where the minimum drum pressure level is six inches water column, the pre-check drum pressure level may be any positive pressure below that, such as four inches water column.

The suction dampening drum 106 may serve as a damper that minimizes pressure fluctuations due to pulsations created by the compressor 108, thereby mitigating difficulties in controlling the RSOFC when the compressor 108 is operating.

By using the above described structures, the process control system 100 maintains a sufficiently steady and positive internal pressure to prevent dangerous air ingress and to provide more stable control of the RSOFC 104.

INDUSTRIAL APPLICABILITY

In general, the foregoing disclosure finds utility in various industrial applications, such as, but not limited to, energy production and energy storage. In particular, the disclosed control system may be applied to RSOFC systems and any other application involving fluid production, compression, storage, or the like. By using the disclosed process control system, operators may mitigate the risk of an explosion caused by air ingress and the difficulties in controlling the RSOFC caused by fluctuating compressor suction pressure.

Figure 3:
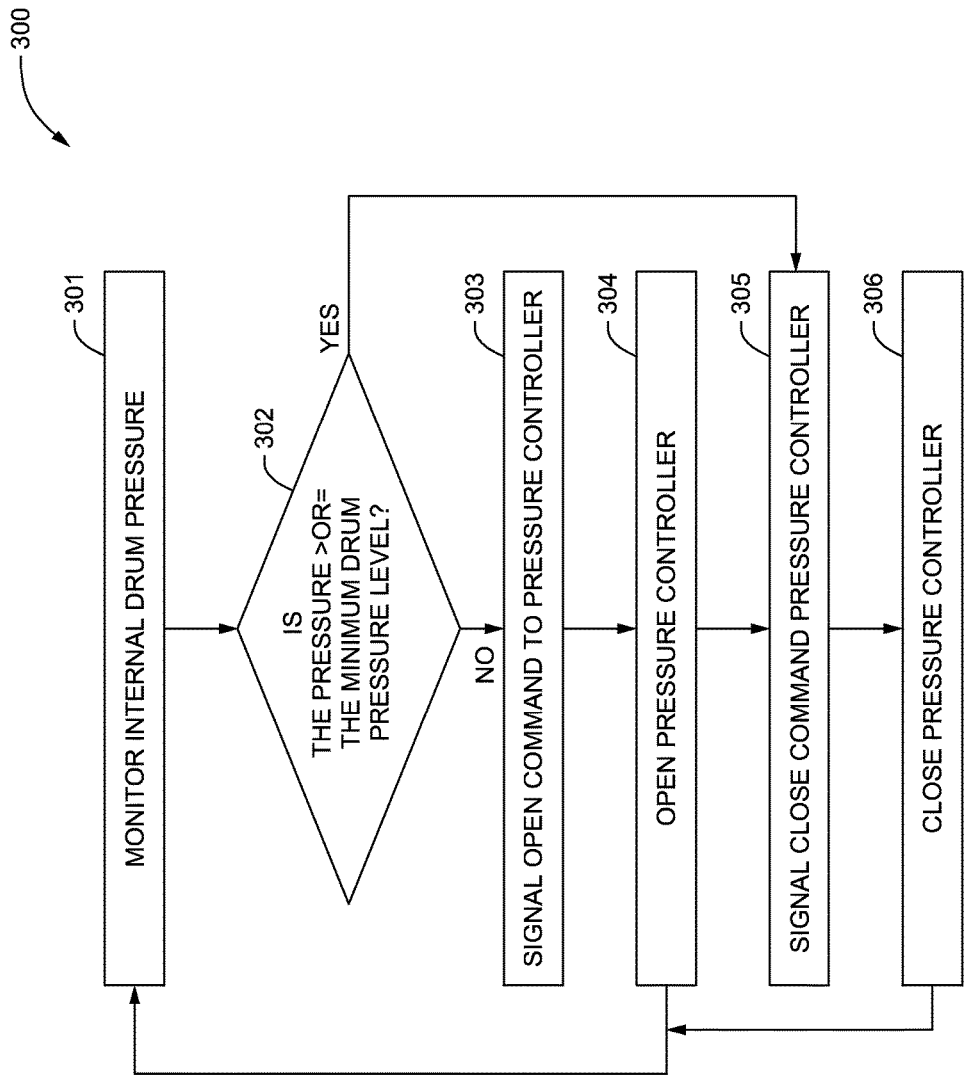
FIG. 3 is process flow representation of the steps performed by the process control system in one embodiment of the present disclosure.

FIG. 3 is a flow diagram showing a method 300 of preventing negative pressures in the system 100. More specifically, at stage 301, the pressure controller 132 monitors the internal pressure of the suction dampening drum 106. At stage 302, the system 100 determines whether the internal drum pressure is greater than or equal to the minimum drum pressure level. Either the pressure controller 132 or the main controller 134 may be programmed to carry out this comparison.

If the internal drum pressure is less than minimum drum pressure level, the pressure controller 132 is signaled to open at stage 303. At stage 304, the pressure controller 132 opens, releasing hydrogen into the product line 120 as described above. The method 300 then returns to stage 301, where the internal drum pressure is monitored.

However, if it is determined at stage 302 that that the internal drum pressure is greater than or equal to the minimum drum pressure level, the pressure controller 132 is signaled to close at stage 305. At stage 306, the pressure controller 132 closes, stopping the flow of hydrogen from the gas storage chamber 102 and through the recycle line 126 as described above. The method 300 then returns to stage 301.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A process control system comprising:
   at least one storage chamber holding compressed hydrogen gas;
   a fuel cell in selective fluid communication with the at least one storage chamber via a feed line, wherein the fuel cell is configured to generate hydrogen gas in an electrolysis mode during which fluid communication with the at least one storage chamber is prevented;
   a suction dampening drum in fluid communication with the fuel cell via a product line configured to receive the hydrogen gas from the fuel cell;
   a compressor configured to receive hydrogen gas from the suction dampening drum and deliver compressed hydrogen gas to the at least one storage chamber;
   a recycle line extending from the feed line to the product line independent of the fuel cell; and
   a pressure controller disposed in the recycle line and configured to selectively communicate compressed hydrogen gas from the at least one storage chamber to the suction dampening drum through the recycle line.

2. The process control system of claim 1, further comprising a pressure valve disposed in the recycle line.

3. The process control system of claim 2, wherein the pressure valve is positioned upstream of the pressure controller.

4. The process control system of claim 1, further comprising a condenser disposed between the compressor and the at least one storage chamber.

5. The process control system of claim 1, wherein the pressure controller is configured to detect a sensed drum pressure inside the suction dampening drum.

6. The process control system of claim 5, wherein the pressure controller is configured to compare the sensed drum pressure with a predetermined minimum drum pressure level, and wherein the pressure controller is configured to automatically open when the sensed drum pressure is less than the predetermined minimum drum pressure level.

7. The process control system of claim 6, wherein the predetermined minimum drum pressure level is at least two inches water column.

8. The process control system of claim 1, wherein the fuel cell further has a power mode in which the fuel cell consumes hydrogen to produce electricity.

9. The process control system of claim 8, wherein the pressure controller is closed during the power mode and opens variably during the electrolysis mode.

10. A process control system comprising:
    a storage chamber holding hydrogen;
    a fuel cell in fluid communication with the storage chamber via a feed line, the fuel cell having a power mode and an electrolysis mode;
    a suction dampening drum in fluid communication with the fuel cell via a product line;
    a compressor in fluid communication with the suction dampening drum via a suction line and the storage chamber via a high pressure line;

a recycle line extending from the feed line to the product line independent of the fuel cell; and a pressure controller disposed in the recycle line and configured to determine a sensed drum pressure inside the suction dampening drum, the pressure controller further being configured to selectively communicate the hydrogen from the storage chamber to the suction dampening drum via the recycle line to maintain the sensed drum pressure at or above a predetermined minimum drum pressure level.

11. The process control system of claim 10, further comprising a pressure valve disposed in the recycle line.

12. The process control system of claim 11, wherein the pressure valve is upstream of the pressure controller.

13. The process control system of claim 11, wherein the pressure valve and the pressure controller are closed during the power mode.

14. The process control system of claim 11, wherein the pressure controller is electrically actuated and the pressure valve is pneumatically actuated.

15. The process control system of claim 10, further comprising a condenser disposed between the compressor and the storage chamber.

16. The process control system of claim 10, wherein the predetermined minimum drum pressure level is at least two inches water column.

17. A method of process control for a fuel cell system having a storage chamber holding hydrogen, a fuel cell, and a suction dampening drum, the method comprising:

monitoring a sensed drum pressure inside the suction dampening drum; and communicating the hydrogen from the storage chamber to the suction dampening drum through a recycle line independent of the fuel cell when the sensed drum pressure is below a predetermined minimum drum pressure level.

18. The method of claim 17, wherein a pressure controller is disposed in the recycle line, and wherein communicating the hydrogen comprises opening the pressure controller.

19. The method of claim 17, wherein the predetermined minimum drum pressure level is at least two inches water column.

20. The method of claim 17, further comprising isolating the fuel cell from the storage chamber prior to communicating the hydrogen to the suction dampening drum.

* * * * *